July 3, 1928.
F. A. EITELGOERGE
1,675,537
WINDOW WIPER
Filed Aug. 8, 1927
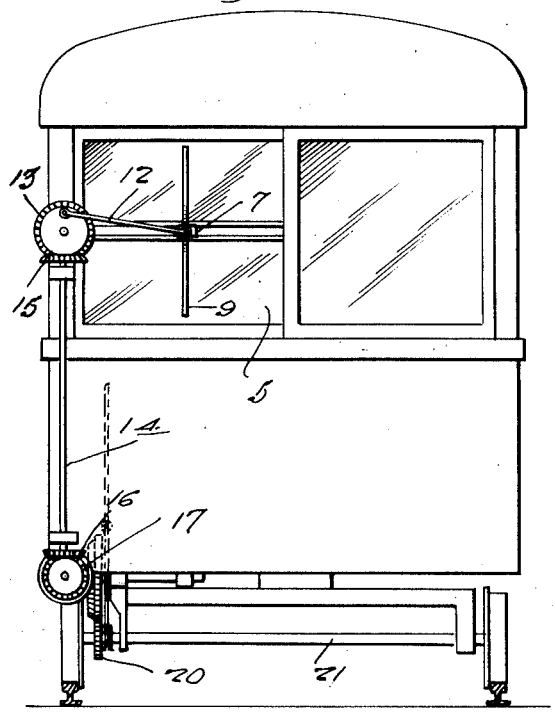
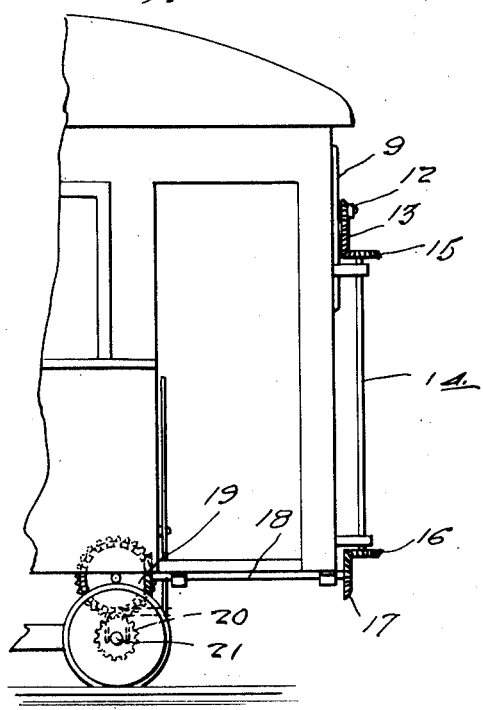
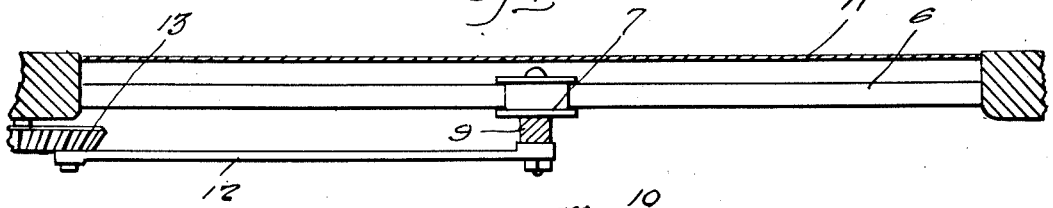
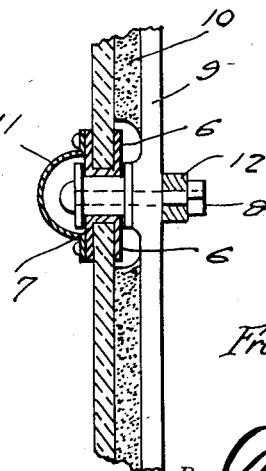
Inventor
Frank A. Eitelgoerge
By Clarence A. O'Brien
Attorney Patented July 3, 1928.

1,675,537

UNITED STATES PATENT OFFICE.

FRANK A. EITELGOERGE, OF DENVER, COLORADO.

WINDOW WIPER.

Application filed August 8, 1927. Serial No. 211,498.

The present invention relates to an improved window wiper, especially adapted for use on street car windows.

The invention has reference to a structure which includes spaced guide tracks mounted on a sectional window, a wiper including a slide mounted between the tracks, an eccentric drive for moving the wiper back and forth in the tracks for cleaning the surface of the outer surface of the glass, and means driven from the car wheel axle for actuating the eccentric.

The particular details, constituting the alleged novelty of the invention, will become more readily apparent from the following description and drawings.

In the drawings:—

Figure 1 is an end elevation showing the device applied to a car.

Fig. 2 is a side view of the same.

Fig. 3 is an enlarged sectional view showing the details of the eccentric drive.

Fig. 4 is also an enlarged fragmentary view showing the track construction and the manner in which the wiper is slidably mounted thereon.

Referring now to the drawings by reference character, it will be seen that the window is designated generally by the reference character 5. In accordance with the present invention, this is made in sections and mounted on each section is a channel-shaped track 6. These tracks are disposed in spaced parallelism to accommodate a slide block 7. This block is provided with marginal flanges slidably contacting the opposite inner and outer surfaces of the tracks. Also, the block has a hole formed therein through which a bolt 8 passes, the bolt forming a mounting and retainer for wiper.

The wiper comprises a bar or backing member 9 carrying a rubber strip or squeegee 10. Disposed on the inside of the glass and over the track is a semicircular weather shield 11 fastened to the flanges of the respective tracks.

Motion is imparted to the wiper through the medium of a link 12, which has eccentric connection with an operating gear 13. The means for operating the gear comprises a vertical shaft 14 having a pinion 15 at its top in mesh with the gear 13. It also has a pinion 16 at its bottom in mesh with a beveled gear 17, on the end of a driven shaft 18 (see Fig. 2). The driven shaft receives rotation from the intermeshing gears 19, and 20. The gear 20 is keyed upon the wheel axle 21.

Incidentally, the car wheels are represented by the reference characters 22. Thus through the medium of this gearing train and shaft arrangement, motion is imparted to the gear 13, which through the medium of the eccentric link serves to move the wiper back and forth in the track 6, thus cleaning the surface of the glass.

It is thought that by considering the description in connection with the drawings, a clear understanding of the invention will be had. Therefore, a more lengthy description is thought unnecessary.

Minor changes in shape, size and rearrangement of parts, coming within the field of invention claimed, may be resorted to if desired.

Having thus described my invention, what I claim as new is:—

1. A window wiper of the class described, in combination, a sectional window, the sections of the window having adjacent edges disposed in spaced relation, upper and lower guide tracks mounted upon the opposed edges of said sections and disposed in spaced relation, a slide block arranged between said tracks and having marginal flanges slidably contacting said tracks, a wiper including a backing member, and a squeegee strip in contact with the outer surfaces of said window sections, a bolt passing removably through an opening in said block and through an opening in said backing member, operating means connected with said bolt, and a retaining nut carried by the threaded end of the bolt and maintaining said operating means, backing member, and block in assembled relation.

2. A window wiper of the class described, in combination, a sectional window, the sections of the window having adjacent edges disposed in spaced relation, upper and lower guide tracks mounted upon the opposed edges of said sections and disposed in spaced relation, a slide block arranged between said tracks and having marginal flanges slidably contacting said tracks, a wiper including a backing member and a squeegee strip in contact with the outer surfaces of said window sections, a bolt passing removably through an opening in said block through an opening in said backing member, operating means connected with said bolt, and retaining nut carried by the threaded end of the bolt, and maintaining said operating means, backing member, and block in assembled relation, and a weather shield disposed on the inner side of said window sections and fastened to said tracks and spanning the space between the tracks.

3. A window wiper of the class described, in combination, a sectional window, the sections of the window having adjacent edges disposed in spaced relation, upper and lower guide tracks mounted upon the opposed edges of said sections and disposed in spaced relation, a slide block arranged between said tracks and having marginal flanges slidably contacting said tracks, a wiper including a backing member and a squeegee strip in contact with the outer surfaces of said window sections, a bolt passing removably through an opening in said block through an opening in the backing member, operating means connected with said bolt, and means maintaining said operating means, backing member, and block in assembled relation, and a weather shield disposed on the inner side of said window sections and fastened to said tracks and spanning the space between the tracks, said operating means comprising a link, and cooperating shafting and gearing, the link being connected with one of the gears, and the gears being arranged to receive motion from a car wheel axle.

In testimony whereof I affix my signature.

FRANK A. EITELGOERGE.